United States Patent [19]

Mattern

[11] Patent Number: 5,610,396
[45] Date of Patent: Mar. 11, 1997

[54] METHOD FOR DETERMINING THE GAIN FACTOR OF A PHOTOMULTIPLIER

[75] Inventor: Detlef Mattern, Erlangen, Germany

[73] Assignee: Siemens Aktiengesellschaft, Munich, Germany

[21] Appl. No.: 513,009

[22] Filed: Aug. 9, 1995

[30] Foreign Application Priority Data

Aug. 12, 1994 [DE] Germany .................... 44 28 672.4

[51] Int. Cl.$^6$ .................... G01D 18/00; G01T 1/208
[52] U.S. Cl. .................... 250/252.1; 250/363.09
[58] Field of Search .................... 250/292.1 R, 363.09, 250/252.1 A, 363.07, 369, 207

[56] References Cited

U.S. PATENT DOCUMENTS

| | | | |
|---|---|---|---|
| 4,047,034 | 9/1977 | Auphan | 250/363.09 |
| 4,228,515 | 10/1980 | Genna et al. | |
| 4,322,617 | 3/1982 | Parker | |
| 4,517,460 | 5/1985 | Meulenbrugge et al. | 250/252.1 |
| 4,583,187 | 4/1986 | Stoub | |
| 4,590,368 | 5/1986 | Govaert | |
| 5,237,173 | 8/1993 | Stark et al. | 250/252.1 R |

FOREIGN PATENT DOCUMENTS

| | | |
|---|---|---|
| 0155377 | 9/1985 | European Pat. Off. |
| 0472281 | 2/1992 | European Pat. Off. |

OTHER PUBLICATIONS

"Hanbuch der Industriellen Meβtechnik," Profos et al., pp. 1171–1173 (1993) no month.

*Primary Examiner*—David P. Porta
*Assistant Examiner*—Richard Hanig
*Attorney, Agent, or Firm*—Hill, Steadman & Simpson

[57] ABSTRACT

In a method for determining a gain factor of a photomultiplier, a radiation source arrangement emits gamma quanta that a scintillation arrangement absorbs and thereby emits photons. The photomultiplier is optically coupled to the scintillation arrangement and emits a signal dependent on the incident photons. The gamma quanta emitted by the radiation source arrangement are collimated onto a measuring location arranged on the scintillation arrangement. A signal amplitude spectrum of the signal is registered using the photomultiplier. Parameters of the signal amplitude spectrum are determined. The gain factor that describes the dependency between the incident photons and the signal is determined on the basis of these parameters.

9 Claims, 3 Drawing Sheets

METHOD FOR DETERMINING THE GAIN FACTOR OF A PHOTOMULTIPLIER

BACKGROUND OF THE INVENTION

1. Field of the Invention

The invention is directed to a method for determining the gain factor of a photomultiplier with a radiation source arrangement that emits gamma quanta, a scintillation arrangement that absorbs incident gamma quanta and thereby emits photons, with the photomultiplier being optically coupled to the scintillation arrangement and which emits an output signal dependent on incident photons.

2. Description of the Prior Art

The use of gamma cameras in nuclear medicine to detect radioactive indicators in vivo and in vitro is an important area of employment of photomultipliers. The gamma quanta emitted by the radioactive indicators are thereby absorbed in a scintillation arrangement. Excited by the absorption of the high-energy radiation, a number of photons, proportional to the average energy, is emitted at the absorption or scintillation location, these photons being acquired by an arrangement of photomultipliers. Dependent on the incident photons, the photomultipliers output an electrical output signal that is employed for localizing (identifying the location of the source of) the scintillation event. Photomultipliers are employed because they can deliver an output signal which is only slightly contaminated with noise, given a high gain of more than $10^6$.

An extremely critical factor in the employment of photomultipliers in a gamma camera is that the respective gains—i.e. the relationship between the triggered electrons and the signal—are the same for all of the photomultipliers or are at least known for each individual photomultiplier, for the following reasons. The image quality of the gamma camera is based, first, on the suppression of gamma quanta having energy outside a predetermined value or range and, second, on the correct reconstruction of the absorption location in the camera. For this first task, an aggregate signal of all signals emitted by the photomultipliers must be formed and accepted or discarded with respect to its pulse amplitude. The signal-to-noise ratio in the image is generally established by this operation. For the source location reconstruction, the signals of the respective photomultipliers must be weighted and added, or otherwise processed in a digital camera with special algorithms. The calibration of the photomultipliers thereby defines the linearity of the imaging, and thus the precision of the measured activity distribution. The calibration of the photomultipliers is critical for determining the energy as well as for the correct reconstruction of the absorption location of a scintillation event. All photomultipliers, as well as the following, analog amplifiers, should have the same gain insofar as possible, or correction factors for each photomultiplier should be known. The actual gain of the photomultipliers must be measured for that purpose.

In a known calibration method for the gain, the camera head of the gamma camera is irradiated with a point source arranged at a distance of about 1.5 m. The photomultipliers of the camera are individually selected via a multiplexer. The signals of the selected photomultiplier are then digitized. The absorption locations of the gamma quanta are thereby randomly distributed over the entire area or surface of the camera head and—with reference to the photomultiplier selected at the moment—all possible spacings of the absorption location and thus a different number of photons per scintillation event, occur. In order nonetheless to obtain a spectrum with an unambiguous photopeak for each photomultiplier, a localizing procedure is utilized in order to select only those scintillation events that fall into a so-called "tune mask area" that generally lies under the selected photomultiplier. The high-voltage of the photomultipliers is then adjusted such that the photopeak lies symmetrically relative to a pre-set energy window. A disadvantage of this technique is that the localizing procedure may be implemented with a possibly uncalibrated photomultiplier, so that the "tune mask area" is also shifted relative to the symmetry axis of the photomultiplier. The photopeak of the events from the "tune mask area" is thus also systematically shifted. In principle, this method can only function iteratively with the calibration ensuing in a number of steps.

In a calibration method disclosed IN U.S. Pat. No. 4,228,515, a camera head having a group of photomultipliers is irradiated with a point radiation source via a collimator. The location of the source is thereby known. The signals of the photomultipliers are digitized and then normalized for each position of the point source. The normalized measured values are then averaged. Additionally, the standard deviation of the normalized measured value compared to the average, normalized measured value is determined for the individual photomultipliers for each position. The slope of the signal responses is calculated for each photomultiplier from the average, normalized signals given a plurality of positions of the radiation source. The relationship between slope and standard deviation yields a weighting factor for each position for the uncertainty or certainty of the signal responses of each photomultiplier. These weighting factors are utilized in the localizing of the scintillation events. The gain of the photomultipliers themselves, however, is not identified with this known calibration method.

SUMMARY OF THE INVENTION

An object of the present invention is to provide a method with which the gain of a photomultiplier can be determined with a non-iterative measurement and with high precision.

This object is achieved in a method according to the invention wherein the gamma quanta emitted by the radiation source arrangement are collimated onto a measuring location arranged on the scintillation arrangement, a signal amplitude spectrum of the photomultiplier output signals is generated, parameters of the signal amplitude spectrum are identified, and the gain factor describing the dependency between the incident photons and the signal is determined on the basis of the parameters.

The statistical fluctuations of the signal amplitudes of the photomultiplier are taken into consideration by this method and are interpreted for direct identification of the gain factor.

In an embodiment, a position parameter and a scatter parameter of the signal amplitude spectrum are used as the aforementioned parameters. The gain can thus be determined from two parameter values, with a higher statistical precision arising as a result.

In a further embodiment, the gain factor is determined from the quotient of the scatter parameter and the position parameter. It is thereby assumed that the plurality of triggered photoelectrons, and thus the signal as well at least approximately have a Poisson distribution, and thus the scatter parameter is dependent on the position parameter in a known way.

For smoothing the signal amplitude spectrum in a further embodiment, the signal amplitude spectrum is approximated by a Gauss curve, whereby the aforementioned parameters are identified from the Gauss curve.

In another embodiment, signal amplitude spectra are registered at various measuring locations, parameters of the signal amplitude spectra are identified, an intermediate gain factor respectively corresponding to a signal amplitude spectrum is determined on the basis of the parameters, and an average gain factor that describes the dependency between the incident photons and the signal is calculated from a statistical distribution of the intermediate gain factors. The linearity of the photomultiplier can thus also be checked; larger deviations of the intermediate gain factors from the average gain factor indicate linearity problems.

In order to shorten the measuring time, the gamma quanta are simultaneously collimated onto different measuring locations in a further embodiment, and the signal amplitude spectra are simultaneously registered.

In a further embodiment, only signals above a limit value are utilized for the formation of the signal amplitude spectra. Measuring imprecisions due to noise are thus reduced to a significant extent.

In another embodiment a number of photomultipliers are optically coupled to the scintillation arrangement and a signal amplitude spectrum is simultaneously registered with each photomultiplier. A short measuring time for determining all gain factors is thus achieved given a gamma camera having a larger number of photomultipliers.

DESCRIPTION OF THE PREFERRED EMBODIMENTS

Figure 1:
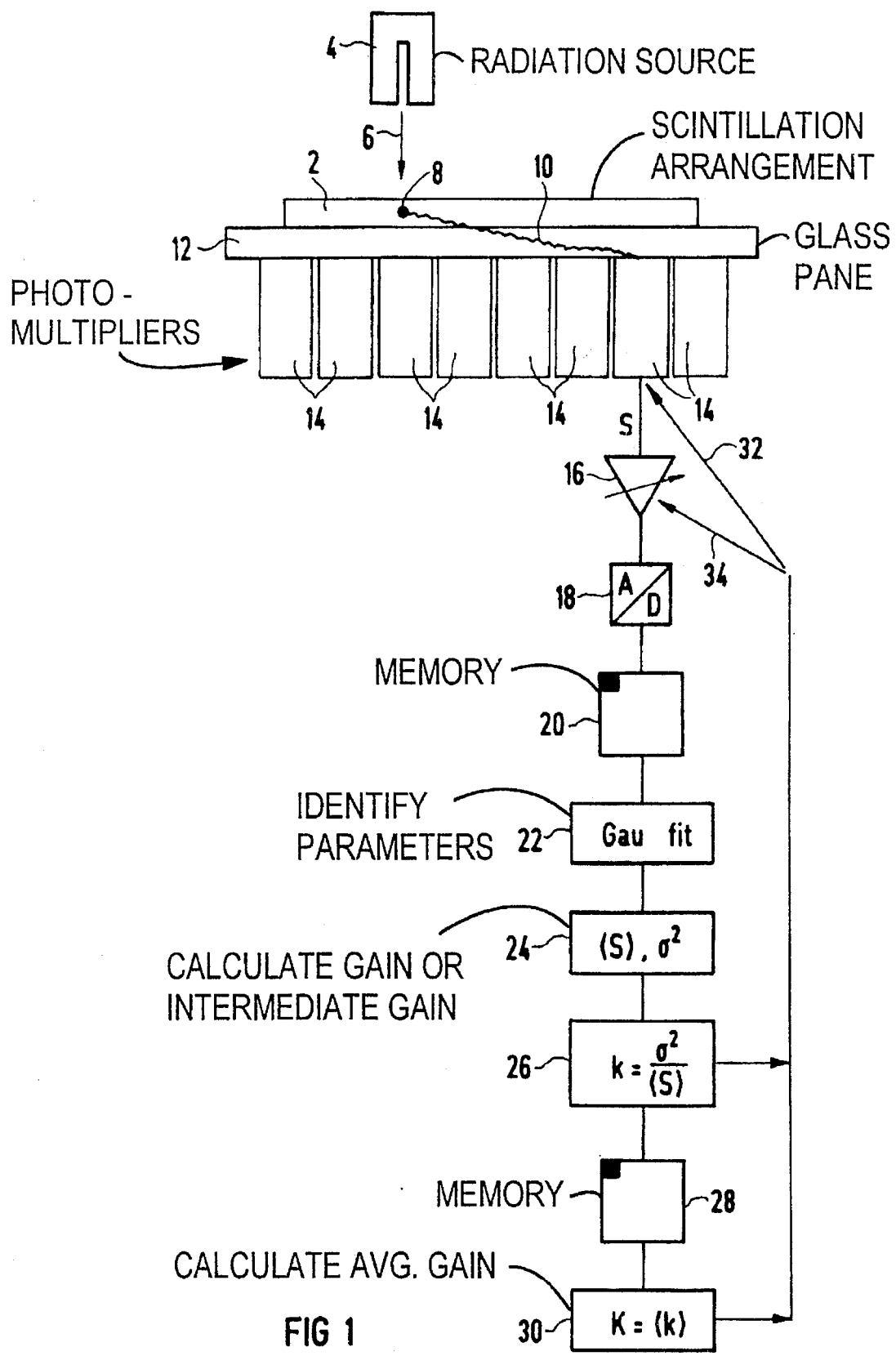
FIG. 1 illustrates the basic steps for the direct determination of the gain factor of a photomultiplier in accordance with the principles of the present invention.

FIG. 1 schematically shows a side view of a scintillation arrangement 2 composed of a thallium-activated sodium iodide single crystal (NaI/Tl single crystal) that forms part of a camera head of a gamma camera. Gamma quanta—symbolized by an arrow 6—from a radiation source arrangement 4, for example a cobalt$^{57}$ source, are collimated onto a measuring location 8 arranged on the scintillation arrangement 2. The gamma quanta are absorbed in the scintillation arrangement 2 and thereby emit light flashes in the visible range. The absorption of a gamma quantum given simultaneous emission of photons is also referred to as a scintillation event. The light flashes or photons are symbolized by a wavy line 10 in FIG. 1.

A number of photomultipliers 14 are optically coupled to the scintillation arrangement 4 via a glass (Pyrex®) pane 12. Eight photomultipliers 14 are shown here. Standard gamma cameras, however, have nineteen or more photomultipliers 14 that are optically coupled at uniform intervals to a rectangular or round, large-are a sodium iodide crystal 2.

Upon incidence, the photons 10 trigger electrons from a photocathode of the photomultiplier 14, these electrons being in turn emitted as an output signal S after amplification. The gain arising from this sequence of events must either be the same, or at least individually known, for all photomultipliers 14 in a gamma camera that has a number of photomultipliers 14, so that fluctuations of the gain factors of the individual photomultipliers 14 can be compensated. The number of electrons triggered by a photon, however, is not always the same but is statistically distributed and can be described by a Poisson distribution. For a Poisson-distributed random quantity is that the variance $\sigma^2$ thereof is equal to the expectancy value. This known distribution factor is evaluated in accordance with the principles of the present invention for determination of the gain factor of a photomultiplier 14.

In this context, the following is valid:

$$S = K \cdot N,$$

wherein S is the output signal of the photomultiplier 14, k is the gain factor of the photomultiplier, and N is the number of electrons triggered at the photocathode.

Due to the Poisson distribution, $$\sigma^2(S) = \sigma^2(k \cdot N) = k^2 \cdot \sigma^2(N) = k^2 <N> = k \cdot <S>,$$

wherein $\sigma^2(S)$ represents the variance of the signal height spectrum and $<S>$ represents the expectancy value of the signal height spectrum. The gain factor k is derived from the quotient of variance and expectancy value of the signal height spectrum:

$$k = \frac{\sigma^2(S)}{<S>}$$

When different static characteristic quantities or different distribution functions, are utilized for the determination of the gain—which would be fundamentally possible—, modified relationships would apply. What is important, however, is that signal amplitude fluctuations that arise from different scintillation locations are always avoided due to the collimated radiation. Only signal amplitude fluctuations that are caused by the irregularities at the photocathode thus occur.

This relationship is utilized in the inventive method for determining the gain, as set forth below. For explanation, only one measurement channel is shown in FIG. 1. This measurement channel can either be connected to each photomultiplier 14 via a switching stage (not shown), or a separate measurement channel can be provided for each photomultiplier 14. The output signal S of the photomultiplier 14 is supplied via an amplifier 16 to an analog-to-digital converter 18. The signal amplitude spectrum of the amplified and digitized output signal of the photomultiplier 14 is stored in a memory connected to the analog-to-digital converter 18. The frequency with which a signal amplitude occurs in a measuring period is thereby acquired for every signal value. The signal amplitude spectrum can also be interpreted as a histogram of the signal amplitudes that are emitted by the photomultiplier 14 as a result of the scintillation events. After the signal amplitude spectrum has been produced for the given measuring location 8 with an adequate number of scintillation events, this signal amplitude spectrum is approximated by a Gauss curve—represented by step 22 labelled "Gauss fit". Irregularities in the course of the curve are thus smoothed on the basis of a finite measuring time.

The expectancy or average value $<S>$ and the variance $\sigma^2$ are then determined in step 24 from the Gauss curve as parameters. In a further step 26, the gain k for the measuring location 8 is determined from the two statistical parameters according to the relationship set forth above.

In order also to check the linearity of the gain dependent on the incident photons, the position of the measuring location 8 is varied and the gain arising for each measuring location 8 is determined. The distribution of the gain k is thereby stored in a memory 28, and an average gain K over all measuring locations 8 is formed in a further step 30. When the gains of all photomultipliers 14 have been determined, gain fluctuations of the individual photomultipliers 14 relative to one another can be compensated either by a variation of the dynode voltages of the photomultipliers— symbolized by an arrow 32—or by a corresponding variation of the gain of the amplifiers 16—symbolized by an arrow 34. This can occur both with the gain k from step 26 that was determined from measurements at a single measuring location, or—with better statistical precision—with the averaged gain K from block 30. In this latter instance, the step 26 only supplies intermediate gain values k.

Figure 2:
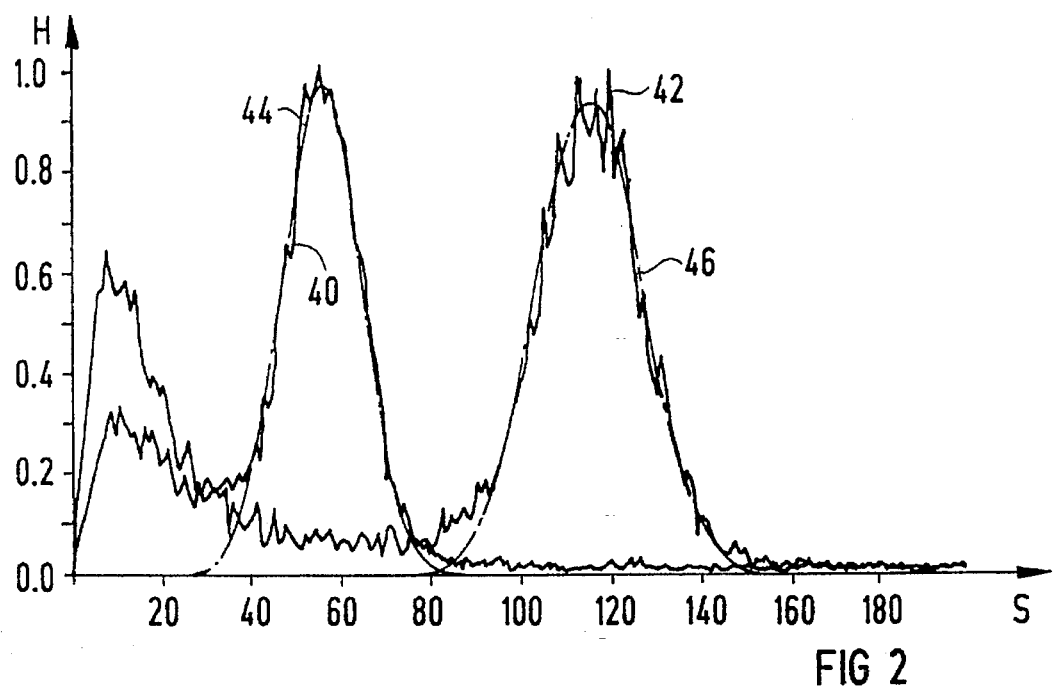
FIG. 2 shows two different signal height spectra that are approximated by Gauss curves obtained in accordance with the invention method.

As an example, FIG. 2 shows two signal amplitude 40 and 42 as stored in the memory 20 for two different measuring locations 8. The frequency H with which the corresponding signal amplitudes S had been acquired is entered dependent on the signal amplitude S. A highly irregular curve of the signal amplitude spectra 40 and 42 can be seen. In order to be independent of the irregularities in the determination of the gain factor k or K, both signal amplitude spectra 40 and 42 are approximated by respective Gaussian curves 44 and 46, from which the statistical parameters can be more simply calculated because local maxima and minima are smoothed. The signals arising from stray effects in the scintillation arrangement are also blanked out by means of the approximation by the Gaussian curve. The signals S can also be conducted through a signal threshold stage in order to largely suppress noise effects, but this is not shown here.

Figure 3:
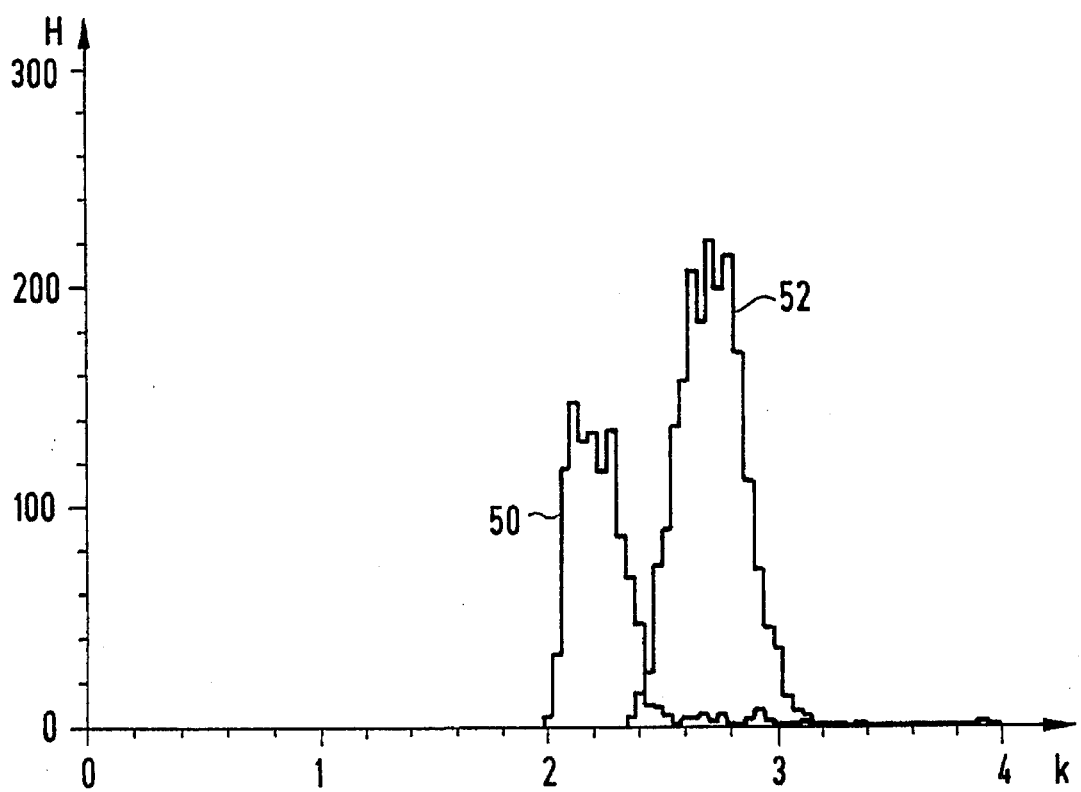
FIG. 3 shows a distribution of the gain factors of two photomultipliers obtained in accordance with the invention method.

FIG. 3 shows respective histograms 50 and 52 of the gains k as stored in the memory 28 for two different photomultipliers 14. The histogram of the gains k arises by variation of the measuring location 8 and represents the distribution of the frequency H of occurrence of the gains k. The average gains K are determined on the basis of these histograms 50 and 52. A value of 2.249+/−0.0018 with a variance of 0.196 was determined for the average gain K of the first photomultiplier, and an average gain K of 2.706+/−0.003 with a variance of 0.148 was determined for the second photomultiplier in the example of FIG. 3 according to a statistical evaluation.

Figure 4:
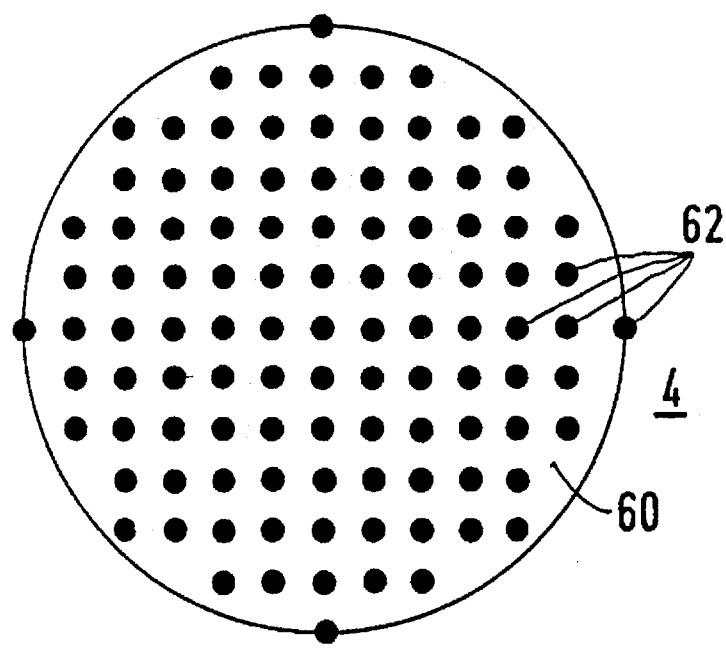
FIG. 4 is a plan view onto a radiation source arrangement for the simultaneous determination of the gain factors of a number of photomultipliers in a gamma camera in accordance with the principles of the present invention.
Figure 5:
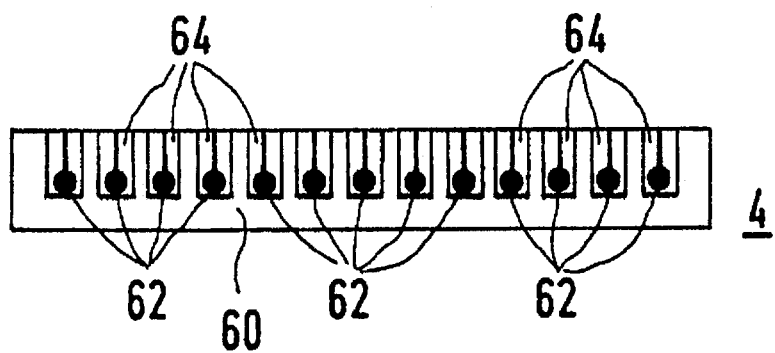
FIG. 5 is a side view of the radiation source arrangement of FIG. 4.

Long calibration times can exist for large gamma cameras even though the signal amplitude spectra for all photomultipliers 14 can be simultaneously determined given the irradiation of a single measuring location—assuming one measurement channel is allocated to each photomultiplier 14. In order to shorten the long measuring time of the gain factors caused by the rastering or scanning, using a single point source of radiation, a radiation source arrangement 4a according to FIGS. 4 and 5 with which different measuring locations 8 can be simultaneously irradiated collimated, can be utilized. a number of radiation sources 62 of, for example, cobalt[57] are arranged at regular intervals in a round, plastic pane 60 whose size corresponds to the scintillation arrangement 2. As may be seen in the side view of FIG. 5, lead recesses 64 collimate the radiation onto the measuring locations 8. The spacing of the individual radiation sources 62, arranged grid-like in the radiation source arrangement 4a, is determined by the resolution of a de-adjusted camera, i.e. a camera whose photomultipliers 14 have different, non-compensated gain factors.

Although modifications and changes may be suggested by those skilled in the art, it is the intention of the inventors to embody within the patent warranted hereon all changes and modifications as reasonably and properly come within the scope of their contribution to the art.

I claim as my invention:

1. A method for determining the gain factor of a photomultiplier, said photomultiplier being used with a radiation source which emits gamma quanta, a scintillation arrangement which absorbs gamma quanta from said radiation source incident thereon and thereby emits photons, and said photomultiplier being optically coupled to said scintillation arrangement and emitting an electrical signal dependent on photons from said scintillation arrangement incident on said photomultiplier, said method comprising the steps of:

collimating said gamma quanta emitted by said radiation source onto a measuring location on said scintillation arrangement;

registering a plurality of output signals using said photomultiplier corresponding to the collimated gamma quanta, each output signal having an amplitude and said output signals in combination forming a signal amplitude spectrum having a location parameter and a scatter parameter associated therewith;

identifying said location and scatter parameters of said signal amplitude spectrum; and identifying the gain factor of the photomultiplier, which identifies a dependency between photons incident on said photomultiplier and the amplitude of said output signal, using said location and scatter parameters.

2. A method as claimed in claim 1 wherein the step of identifying said gain factor comprises identifying said gain factor as a quotient of said scatter parameter and said location parameter.

3. A method as claimed in claim 1 comprising defining an expectancy value of said signal amplitudes as said location parameter.

4. A method as claimed in claim 1 comprising identifying the variance of said signal amplitudes as said scatter parameter.

5. A method as claimed in claim 1 comprising the additional step of approximating said signal amplitude spectrum by a Gauss curve, said Gauss curve having Gauss curve parameters associated therewith, and using said Gauss curve parameters as said parameters.

6. A method as claimed in claim 1 wherein the step of collimating said gamma quanta comprises collimating said gamma quanta onto a plurality of different measuring locations on said scintillation arrangement and identifying said parameters of said signal amplitude spectrum for each measuring location and identifying an intermediate gain factor from said parameters for each measuring location, said intermediate gain factors comprising a statistical distribution, and calculating an average gain factor, which identifies the dependency between said collimated photons and said output signal of said photomultiplier, from said statistical distribution of said intermediate gain factors.

7. A method as claimed in claim 6 wherein the step of collimating said gamma quanta onto a plurality of different measuring locations comprises simultaneously collimating said gamma quanta onto said plurality of different measuring locations and simultaneously identifying the signal amplitude of the output signal of the photomultiplier for each measuring location.

8. A method as claimed in claim 1 comprising the additional step of setting a limit value, and employing only output signals having an amplitude above said limit value for forming said signal amplitude spectrum.

9. A method as claimed in claim 1 comprising the additional step of optically coupling a plurality of photomultipliers to said scintillation arrangement and simultaneously obtaining a signal amplitude spectrum from each photomultiplier.

* * * * *